INVENTORS
Alfred H. Miller and
James E. Starner

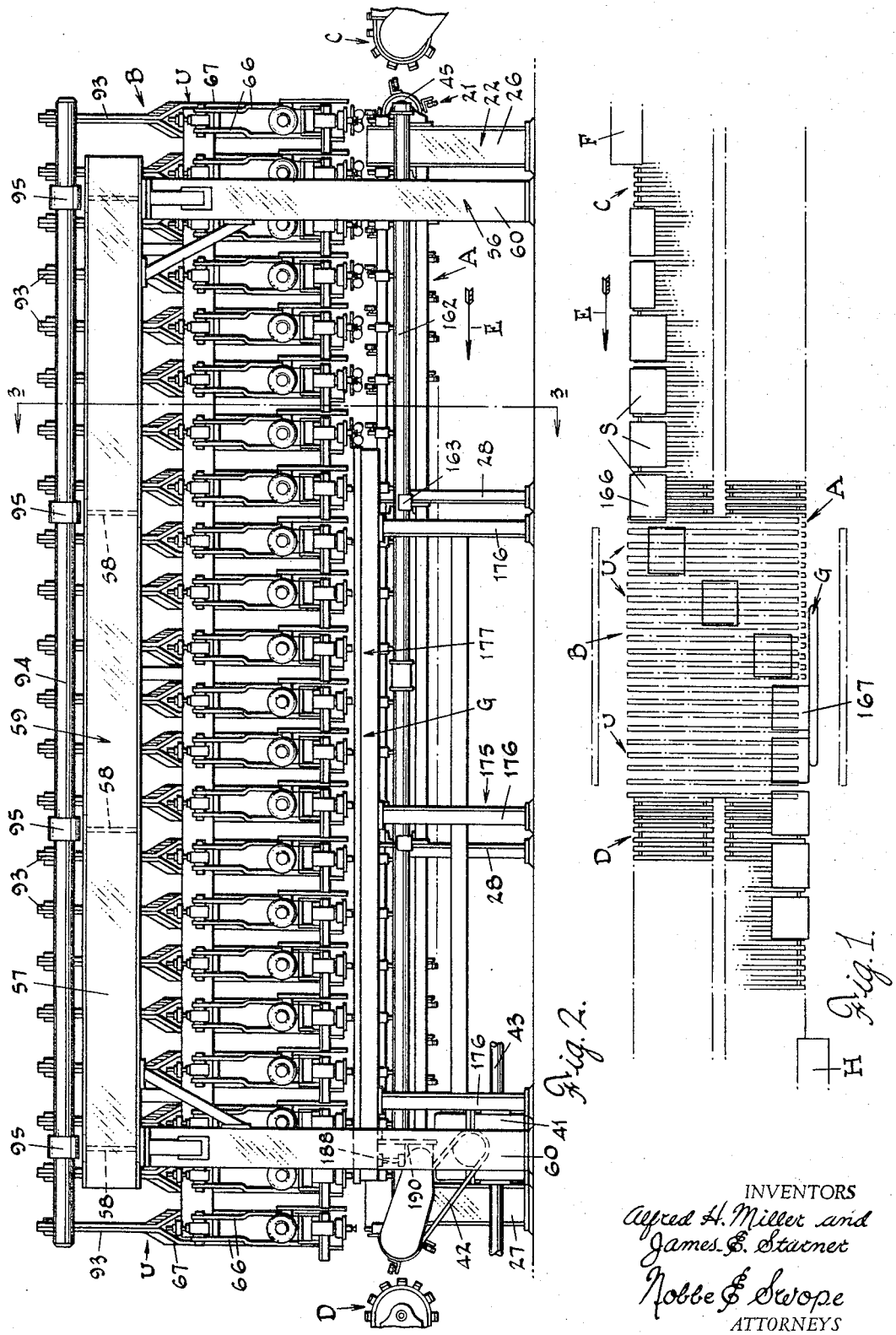

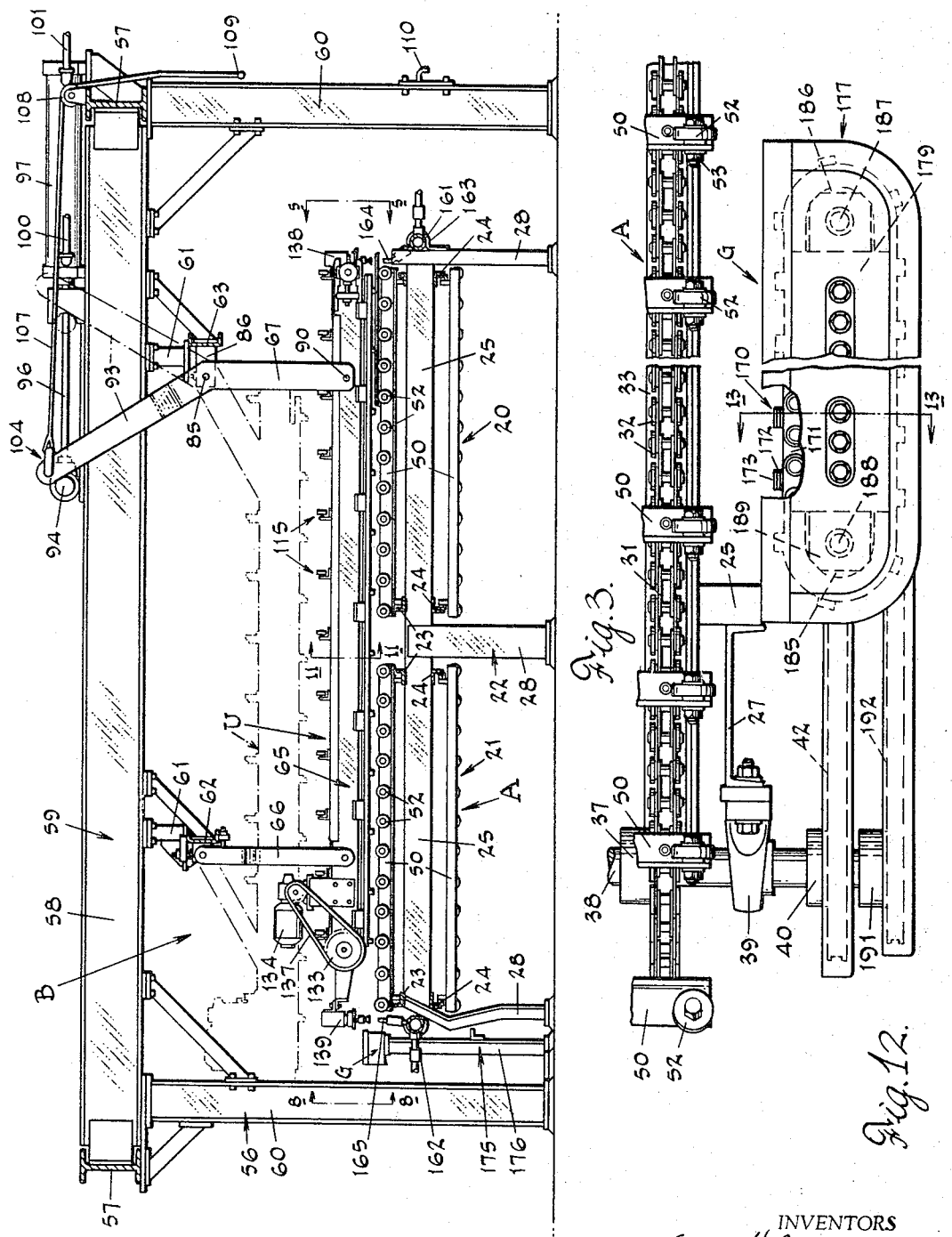

Nobbe & Swope
ATTORNEYS

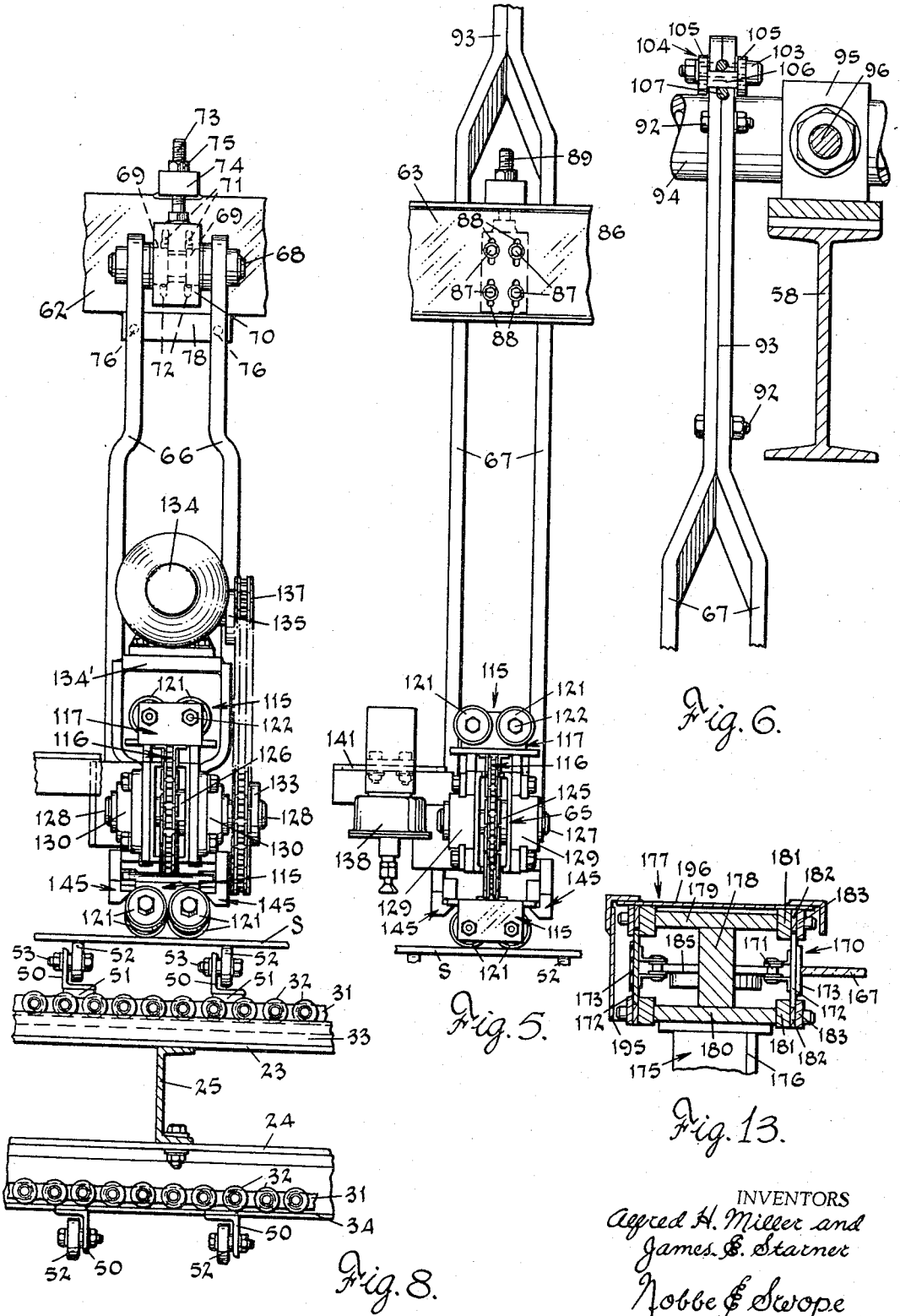

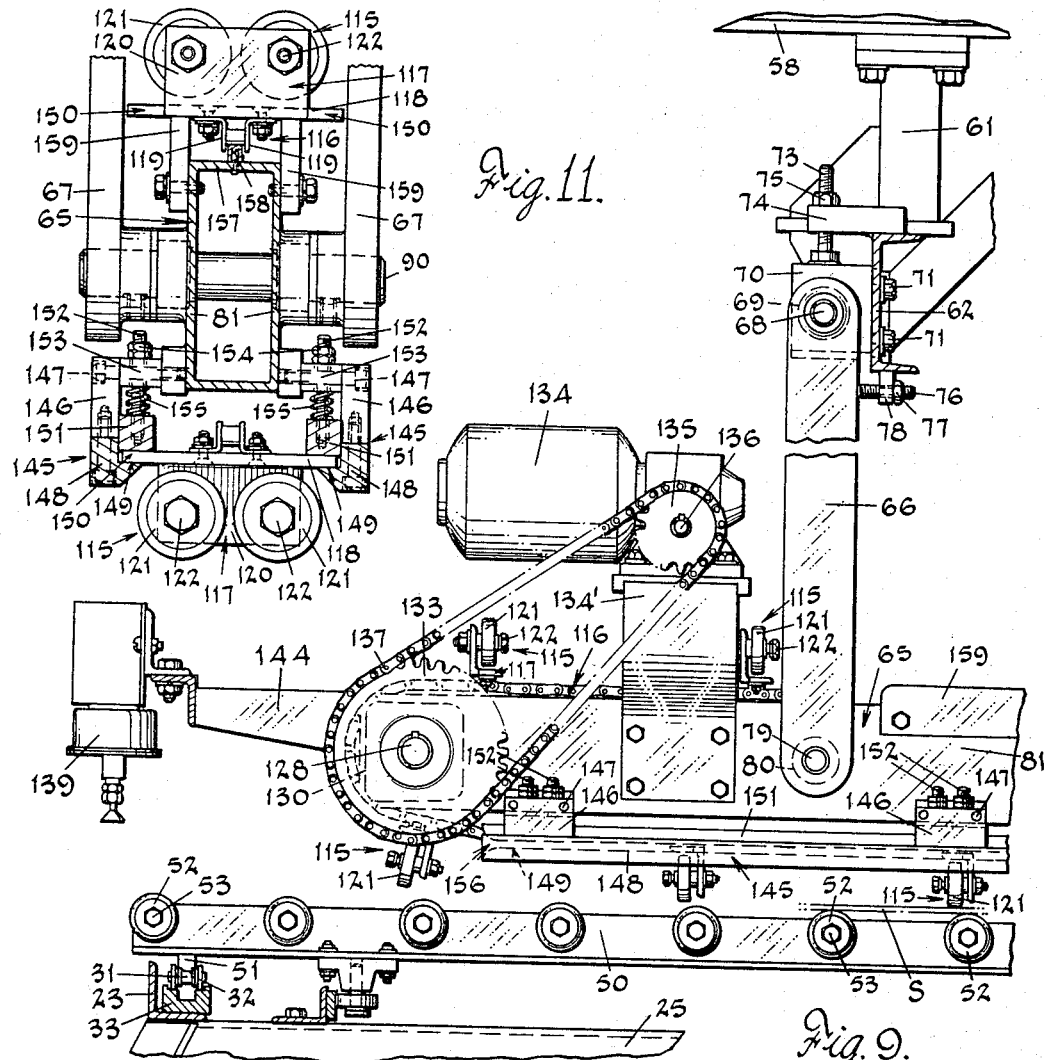

United States Patent Office 3,342,301
Patented Sept. 19, 1967

3,342,301
CONVEYOR APPARATUS
Alfred H. Miller and James E. Starner, Toledo, Ohio, assignors to Libbey-Owens-Ford Glass Company, Toledo, Ohio, a corporation of Ohio
Filed Apr. 23, 1965, Ser. No. 450,315
4 Claims. (Cl. 198—24)

The present invention relates broadly to the art of conveying materials and more particularly is concerned with improved apparatus for conveying articles along a longitudinally directed path of movement and transferring the articles in succession from one side of the path of movement to the opposite side of the path.

The principal object of this invention is to provide improved conveyor apparatus for carrying a plurality of articles successively along a first path of movement with coacting means engaging an article for transverse movement of each article of said plurality from one side of the first path of movement to an oppositely disposed parallel side of said path while continuing movement of each article along the first path of movement.

Another object is to provide conveying apparatus of the above character in which conveying means is adapted to carry articles along a substantially horizontal, forwardly directed path while supporting the articles for simultaneously occurring movement in a transverse direction with article engaging means adapted to produce such transverse movement.

Another object is to provide conveying apparatus of the above character in which the article engaging means is disposed above said conveying means and is adapted to freely permit forward movement of an article while causing the same to be moved in a transverse direction.

Another object is to provide conveying apparatus of the above character in which the conveying means and the article engaging means cooperate to cause an article to progressively move in a diagonal direction from one side of a forwardly directed path of movement to a defined position along an opposite parallel side of the path while maintaining a forwardly directed course of movement therealong.

A further object is the provision of conveying apparatus of the above described character in which the article engaging means includes a plurality of transverse motion imparting units with each of said units being individually and automatically controlled by forward movement of a plurality of articles to successively stop and start operation of the units.

Other objects and advantages of the invention will become more apparent during the course of the following description when read in connection with the accompanying drawings.

In the drawings, wherein like numerals are employed to designate like parts throughout the same:

FIG. 1 is a diagrammatic plan view of a transfer conveying apparatus constructed in accordance with this invention;

FIG. 2 is a side elevation of the transfer conveying apparatus;

FIG. 3 is a transverse vertical sectional view of the apparatus taken on line 3—3 of FIG. 2;

FIG. 5 is a fragmentary end elevation of the apparatus as viewed in the direction of arrows 5—5 of FIG. 3;

FIG. 6 is a view similar to FIG. 5 showing the upper end of details illustrated in FIG. 5;

FIG. 8 is a fragmentary end elevation of the opposite side of the apparatus;

FIG. 9 is a fragmentary side elevational view of the apparatus of FIG. 8;

FIG. 10 is a fragmentary plan view;

FIG. 11 is a detail section taken on line 11—11 of FIG. 3;

FIG. 12 is a fragmentary plan view of the exit end of the transfer conveying apparatus;

FIG. 13 is a transverse vertical section taken on line 13—13 of FIG. 12; and

Figure 4:
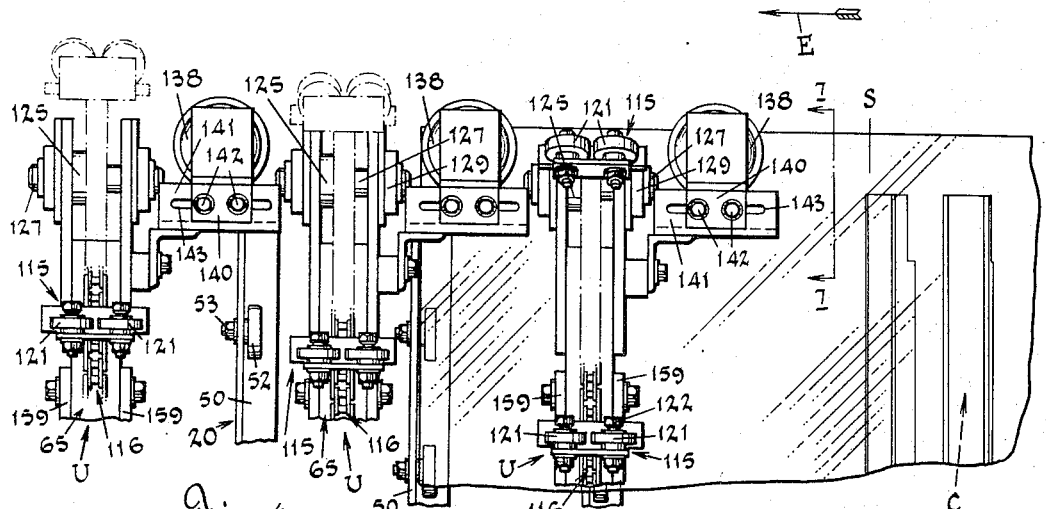
FIG. 4 is a fragmentary plan view of the entry end of the apparatus.

In its broadest aspects, the transfer conveying apparatus of this invention is directed to use in the transportation of articles along a first path of movement and wherein it is desirable to transversely shift or transfer the articles from positions along one side of the path of their movement to positions along a second or the opposite side of the path. This may be necessary for the proper location of a first marginal area of an article with reference to a processing station and then location of a second and oppositely disposed marginal area with regard to a subsequent processing station. While transverse movement of the sheets between processing stations can of course be done manually by workers, it is believed readily understandable that this type of labor, although necessary, is of a monotonous, nonproductive character. As herein provided, when a processing operation has been completed on one marginal area of an article, along one side of a conveyor system, the article enters an intermediate area, between processing stations, and automatically activates pushing devices adapted to produce lateral movement of the article, without interrupting its forward progress, to position the articles in aligned relation with reference to a processing station at the opposite side of the conveyor system.

To this end, a support conveying apparatus is employed to carry a plurality of sheets from a first production conveyor system, associated with one processing station at one side thereof, to an aligned, second production conveyor system associated with an oppositely disposed, subsequent processing station. The apparatus of such a conveying system is adapted to simultaneously permit shifting motion of the sheets in a direction transverse to the path of their supported movement. Associated with and superimposed above this support conveying apparatus, there is provided an automatically operable series of pusher units adapted to move the sheets transversely across the support conveyor apparatus without interrupting their forward progress.

Although the invention is not restricted to any particular use, it has proven particularly advantageous in apparatus for continuously metallizing respective edge surfaces on glass sheets that are to be used in the production of multiple sheet glazing units. One such type of apparatus is disclosed in the patent to Wampler et al., No. 2,938,494, issued May 31, 1960 and assigned to the assignee of the subject application. Therefore, the invention will be specifically described in that connection here.

With particular reference to FIG. 1, there is diagrammatically shown a continuous metallizing line of the type disclosed in the above-mentioned patent. The line includes a support conveying apparatus A with a first production conveyor C and a similar conveyor D arranged in end-to-end relation with opposite ends of the conveyor apparatus A. A transfer or crossover apparatus generally designated by the letter B, constructed in accordance with the invention, is arranged above the conveyor apparatus A. With a plurality of sheets S moving in directions of arrow, indicated by the letter E, the sheets are carried from the first processing station F where the outwardly disposed edge thereof has been metallized. The sheets will move along the conveyor C onto the conveyor apparatus A and below the crossover apparatus B which includes a plurality of pusher units U.

Although in nowise limiting the spirit of the invention, twenty-two such pusher units U are herein illustrated by way of example and about which more will be said later. These units are operated in a direction transverse to the longitudinal path of movement of successive sheets carried on conveyors A, C and D. As the leading end of a sheet passes beneath a unit U, suitably actuated controls associated with each unit cause the same to halt.

When the trailing end of the sheet passes from beneath the control for the first unit U, the units beneath which the sheet is then momentarily positioned are caused to resume operation. Since the longitudinally disposed dimension of the sheet in all instances determines the actual number of units that are caused to stop operation, the sheet continues its forward movement on the conveyor apparatus A until the trailing edge thereof is carried from beneath the first unit. However, when all units resume operation, the sheet is caused to follow a diagonal path of movement as indicated in FIG. 1. This is a result of the combined influences of conveyor A and apparatus B to carry the sheet forwardly and simultaneously push the same transversely at substantially the same rate of sped.

Upon reaching the opposite side of the conveyor apparatus A, the longitudinal edge of the sheet activates suitable controls associated with each unit which cause the units above the sheet to stop, and at the same time the edge of the sheet comes into contact with an aligning unit, generally designated by the letter G, which accurately positions the sheet at the opposite side of the conveyor apparatus A. As the sheet continues its forward movement on the conveyor apparatus A, the trailing edge thereof is moved from beneath successive units which reactivates the individual controls to resume operation of the respective units. The sheet, as it leaves the conveyor apparatus A, is accurately positioned for reception on the production conveyor D, upon which it is carried forward towards and through a processing station indiciated at H.

Support conveying apparatus

With reference now to FIGS. 2 and 3, the support conveying apparatus A will be seen to include two pairs of endless chain belts, forming conveyor belts 20 and 21 and arranged in side-by-side, parallel relation and with their upper flights providing, in common, a substantially horizontal surface on which the sheet materials are carried in a manner to be hereinafter more fully described. In this connection, it might here be mentioned that under certain conditions of operation one pair of chain belts could suffice to accommodate sheets having relatively short transverse dimensions, as herein provided however, the overall width of the apparatus afforded by the conveyor belts 20 and 21 lends itself advantageously to the processing of sheets having a variety of transverse dimensions. Generally speaking, the conveyor belts 20 and 21 are carried on a framework designated by the numeral 22.

This framework 22 is formed by horizontally disposed, longitudinally arranged pairs of angular bars each including upper bars 23 and lower bars 24. The bars 23 and 24 are supported on the respective top and bottom surfaces of transversely disposed channel members 25 that are connected at their respective ends to pairs of vertical channels or pedestals 26 and 27 arranged at the ends of the framework 22 and with leg members 28 being spaced therebetween to support intermediate channels 25.

The conveyor belts 20 and 21 (FIGS. 7–9 and 12) are each formed by the pairs of chain belts 31 having rollers 32 adapted to traverse on tracks 33 mounted on the horizontal leg of the upper bars 23. As viewed in FIGS. 7 and 8, the lower bars 24 are equipped to mount rails or tracks 34 on which the outwardly disposed rollers 32 of the return flights of the chain belts are carried. At one of their common looped ends, the pairs of chain belts 31 are trained about sprockets 37, keyed on shaft 38, journaled in bearings 39 on pedestals 27, as shown in FIG. 12. One end of shaft 38 is equipped with a sprocket 40 that is adapted to be operatively driven from a gear unit 41 by means of chain belt 42. Although the gear unit can be provided with an individual motor, as herein provided, it is operated through a jackshaft 43 which is conventionally employed to provide similar motive power for the conveyor belts of the production conveyors C and D. The opposite looped ends of the chain belts 31 are trained about idler sprockets 45 similarly mounted on a shaft journaled in bearings attached to the pedestals 26.

The sheet supporting surface of the conveyor belts 20 and 21 is formed by angle bars 50 supported at opposite ends by blocks 51 on each of the pair of chain belts 31 and arranged in spaced, parallel relation to one another. On the vertical leg of each bar 50, a series of journaled or ball bearing rollers 52 are supported by bolts 53; said rollers thereby revolving about axes located parallel to the longitudinally directed path of movement. This permits each sheet to be conveyed forwardly between the ends of the apparatus A and simultaneously moved or shifted transversely with an entire freedom of movement.

Referring again briefly to FIG. 1, the sheets S will thus be understood to move forwardly from the first production conveyor C and be received on the rollers 52 associated with the conveyor A. Normally the conveyor 20 or 21, is adapted to carry the sheets forwardly in a longitudinally directed path of movement toward the second production conveyor D. However, as the description of this invention proceeds, it will become apparent that by means of the crossover apparatus B each sheet will be engaged so as to be shifted, concurrently with its forward movement, in the described transverse direction to the end that the sheet will be supported and positively moved in a diagonally directed path from its entry position on the conveyor 20 of the conveyor apparatus A to a suitable position on the conveyor 21 from which it will be delivered to the production conveyor D.

The crossover apparatus

Upon reference to FIGS. 2 and 3, this apparatus B is bodily supported on a framework 56 formed with longitudinally disposed beams 57 and transverse beams 58 forming a substantially rectangular superstructure 59 which is superimposed above the conveyor apparatus A by vertically disposed columns 60. The transversely disposed beams 58 are adapted to support, by means of posts 61, longitudinally disposed channels 62 and 63 on which the several pusher units U are carried.

Since each of the several units U, as shown in FIG. 2, are of identical construction, the description of one such unit, as viewed in FIG. 3 and other figures of the drawings, will suffice for all of the other units. Thus, a pusher unit U essentially comprises a tubular base or body portion 65 that is supported above the plane of the conveyor belts 20 and 21 by spaced parallel pairs of bars 66 and 67. As best illustrated in FIGS. 8, 9 and 10, the bars 66 are carried at their upper ends on a shaft 68 that is journaled by sleeve bearings 69 on a block 70. This block is mounted by screws 71 passing through slots 72 in the web of the adjacent channel 62 and adjusted vertically relative to the channel by mean of an integrally connected threaded rod 73 passed through a block 74 fixed on channel 62 and having thereabove an adjusting nut 75. As viewed in FIG. 9, the channel 62 additionally supports adjusting screws 76, equipped with lock nuts 77, in attached blocks 78; said screws abutting the bars 66.

The lower ends of bars 66 support the tubular body 65 by means of shaft 79 journaled in bearing collars 80 secured to the vertical side walls 81 of the body portion and located at its ends in hubs 82 formed at the lower ends of the bars (FIG. 10).

The bars 67 (FIG. 3), located in spaced relation to the bars 66 and adjacent the opposite end of the body portion 65, are similarly supported by a shaft 85 journaled in a block 86 adjustably connected to the channel 63. As described in connection with the block 70, block 86 (FIG. 5) is mounted on the channel 63 by screws 87, passed through slots 88 in the channel, and is vertically adjustable by means of threaded rod 89. Likewise, the bars 67, at their lower ends, are adapted to carry the base member or body portion 65 on shaft 90 (FIG. 11) in substantially the same manner as that described in connection with the lower ends of bars 66. The blocks 70 and 86 are mounted for adjustment, since it is quite essential that both of the pairs of bars 66 and 67 be vertically movable to definitely locate the body portion 65 in a substantially horizontal plane as well as in predetermined spaced relation to the surface of the conveyors 20 and 21. In this respect, the adjusting screws 76 also provide means for making minute vertical adjustment of the pusher unit.

Above the blocks 86, the bars 67 are joined together by bolts 92 to form an upwardly directed lever portion 93. As viewed in FIGS. 2, 3 and 6, each of the several levers 93 is adapted to be engaged by a horizontal, longitudinally disposed tubular rod or bar 94. As seen in FIG. 2, the rod 94 is equipped with spaced collars 95, each of which, as in FIGS. 3 and 6, is connected by associated piston rod 96 to an individual cylinder 97. These cylinders are mounted by suitable plates or platforms on the transversely disposed beams 58 of the superstructure 59.

Generally speaking, the cylinders 97 are connected in common to a source of hydraulic power as through pipes 100 and 101 whereby, upon application of pressure by pipe 100 to the rod ends of the cylinders, the piston rods 96 will be retracted toward the cylinders. The lever ends 93 of all of the bars 67 will accordingly be swung from the full line positon in FIG. 3 to one such as is indicated in broken line. This results in simultaneously occurring upward swinging movement of the bars 66 and 67 to raise the pusher units U in unison to an inoperative position above the sheet conveying apparatus A, as indicated in broken line (FIG. 3). Upon application of pressure to the head end of cylinders 97 by pipes 101, the plurality of units will, of course, be lowered into their operative positions.

In order that a pusher unit U can, for one reason or another, be individually removed to the inoperative position, each lever 93 (FIGS. 3 and 6) adjacent its upper end is provided with a bolt 103 securing a clevis 104 formed by spaced links 105 and pin 106; said clevis connecting the looped end of a cable 107 to the associated lever. Cable 107 is trained over a sheave 108 on the superstructure 59 and is provided with a looped handle portion 109 which can be fixed to a hook or like bracket 110 as shown in FIG. 3.

Each pusher unit U is equipped with sheet engaging elements 115 adapted to contact the upper surface of the sheet and move the same transversely while yet permitting free movement. As viewed in FIG. 11, these elements are carried by an endless chain belt or conveyor 116 and each include an angular base member 117 that is connected, by its horizontal flange or leg 118 and in spaced relation, to the belt, by means of conventionally known bracket links 119 included in the chain belt per se. The vertical leg 120 of each member 117 mounts a pair of ball bearing rollers 121 equipped with non-abrasive tires or annular peripheries, by means of bolt connections 122.

Figure 7:
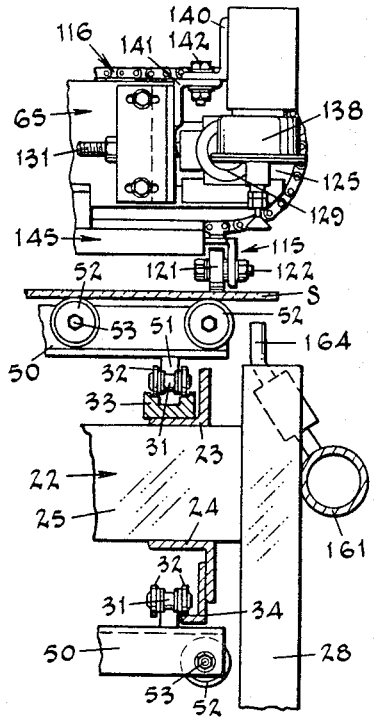
FIG. 7 is a transverse vertical sectional view taken on line 7—7 of FIG. 4.

The chain belt 116, in each instance, is trained at its looped ends about sprockets 125 and 126 on shafts 127 and 128, respectively, which are journaled by bearings 129 and 130 at the opposite ends of the base member 65. As shown in FIGS. 4, 5 and 7, shaft 127 is journaled in the bearings 129 that are of a conventional type to permit adjustment of the sprocket 125 with reference to the respective end of the base member by threaded members 131 and thereby maintaining the chain belt in proper tension.

The shaft 128 (FIG. 9) is equipped with a sprocket 133 which is driven from a source of power such as motorized gear unit 134, by drive sprocket 135 on shaft 136 of the unit and chain belt 137. The gear unit 134 is mounted on the base member 65 by bracket 134'. For reasons to be more fully hereinafter described, the electric circuitry of each motor unit 134 is individually controlled by pressure-activated switch devices 138 and 139 mounted at the ends of the respective base members 65. In the case of switch 138, the same is mounted by a bracket 140 (FIG. 4) on a support member 141 fixed to one side wall 81 of the base member 65. By means of bolts 142 passed through a slot 143 in the support member, the bracket 140 can be shifted laterally in initial mounting of the switch or for later adjustment. The same is also true with regard to the switch 139 which is mounted in the same manner on a support member 144 at the opposite end of the unit.

The active flight of the chain belt 116, which in this instance is the lower flight, is supported to traverse a horizontally defined path which is afforded by track members 145 arranged along the side walls 81 of the body portion or base member 65. These track members are mounted, as in FIG. 11, by L-shaped brackets 146 secured to the side walls 81 by bolts 147 at points regularly spaced between the ends of the body portion. The track members 145 include a lower bar or rail 148 providing an upper support surface 149. The surfaces 149 slidably support the lower surfaces of the ends 150 of the horizontal leg 118 of each base 117 while a bar 151 is lightly urged against the upper surfaces of each of the leg ends 150 to maintain the rollers 121 of the associated glass engaging elements 115 in contact with the upper surface of a glass sheet.

The bars 151, for this purpose, are provided with upstanding threaded rods 152 passing through the horizontal leg section 153 of the brackets 146 and equipped thereabove with lock nuts 154. Coil springs 155 are interposed between the bracket leg sections 153 and the bars 151 and the nuts 154 can thus be employed to determine the effective pressure of the bars 151 on the leg ends 150. Preferably the entry and exit ends of the track members 145 and, more specifically, the respective ends of the rails 148 and bars 151, are suitably shaped, as at 156 (FIG. 9), to permit relatively free movement of the base members as they enter and leave the defined path area of the track members.

The return flight of the chain belt 116 traverses a path across the surface of the upper wall 157 of base member or body portion 65 and is more or less confined to a straight path by a bar 158 that is secured along the medial area of the top wall; the rollers of the chain belts being supported on the bar. Also, a pair of oppositely disposed rails 159 are provided on the side walls 81 of the base member to support the elements 115 during their movement with the return flight of the chain belt.

As previously described, the motor unit 134 of each pusher unit is independently controlled by the switches 138 and 139 which, as viewed in FIG. 3, are supported at the opposite ends of the base member 65. Both of these switches are of the pneumatic or air pressure activated type and, as herein employed, are adapted to half operation of the motor unit 134 whenever the active source of air under pressure is interrupted. Such a source of air under pressure is obtained from manifold pipes 161 and 162 arranged along the sides of the framework 22 and supported thereon by brackets 163. The pipes are equipped with suitably spaced jet pipes or nozzles 164 and 165, respectively, which are located so as to direct a stream of air upwardly toward a switch 138 or 139, as the case may be.

In accordance with normal operation of the transfer conveying apparatus, the motor units 134 of all of the pusher units U operate substantially continuously to drive the associated chain belts 116. When the leading end of a sheet, indicated at 166 in FIG. 1, approaches and enters between the pusher units, it progressively interrupts the air streams between the nozzles 164 and the switches 138. This causes the circuits to the affected motor units to be broken with resultant stoppage of the associated chain belts. As herein shown, the longitudinal dimension of the sheet 166 will span a distance occupied, for example, by four pusher units and while the belts of these units are idle, the rollers 121 will revolve freely on their axes and in rolling contact with the upper surface of the sheet while the same is carried along the longitudinal path of its forward movement. However, by means of an electrical system to hereinafter be more fully described, when the trailing end of the sheet passes from beneath the first switch 138, the motor units, presently rendered idle, will be reactivated to drive the associated chain belts 116 and by means of the rollers 121 push the sheet in a direction transverse to the path of its forward motion. Now, since the rollers 52 on which the sheet is bodily supported will permit transverse motion of the sheet and the transversely moving rollers 121 similarly permit its continued longitudinal motion, the resultant path described by the sheet will be substantially diagonal across the conveyors 20 and 21 until the leading side of the sheet engages the aligning conveyor G. Simultaneously, the said sheet edge passes beneath the switches 139 so as to interrupt the streams of air from the nozzles 165; this serving to disconnect the motor units 134 of the pusher units above the sheet and thereby bringing the associated chain belts to a halt. Consequently, the sheet indicated at 167, will be carried forwardly by the conveyor 21 until it is passed onto the support elements of the second production conveyor D. As the sheet moves beneath each of the remaining units, the motor units 134 thereof will be halted and then permitted in sequence to resume normal operation in the manner above described.

The aligning conveyor

With further reference to the aligning unit or conveyor G, it was earlier stated that the unit receives the laterally leading side or edge of a glass sheet as it is shifted across the conveyor 21, as shown in FIG. 1, to accurately position the same relative to the production conveyor D and the processing station H. For this purpose, a flexible wall, provided within the aligning unit, is contacted by the edge of the sheet and moves with the forwardly advancing sheet such as is indicated by the sheet 167 in FIG. 13. The wall, generally designated by the numeral 170, is carried by a chain belt 171 and the alternately spaced links thereof are equipped with vertically disposed plates 172 having nonabrasive layers 173, as of rubber, on their outwardly directed surfaces.

More particularly, the aligning unit G (FIGS. 12 and 13) includes a framework 175 that is supported by pedestals 176 and substantially enclosed within a case 177. The framework comprises a longitudinal center wall 178 to which are secured horizontal upper and lower panels 179 and 180, respectively. The opposite edges of these panels support a plurality of plates 181, 182 and 183 which form guide tracks within which the top and bottom edges of plates 172 are moved. The chain belt 171 is trained about a drive sprocket 185 and an idler sprocket 186; said sprocket 186 being keyed to a vertical shaft 187 journaled in bearings in the adjacent ends of the panels 179 and 180. The sprocket 185, on the opposite end of the framework, is fixed on shaft 188 in bearings 189. The lower end of shaft 188 is driven by a gear reduction unit 190 (FIG. 2) that is operatively connected to the shaft 38 of conveyor A through sprocket 191 and chain belt 192 as in FIG. 12.

As shown in FIG. 13, the case 177 is formed by a vertical rear wall 195 and cover panel 196. The active flight of the flexible wall 170 traverses an open area opposite the rear wall 195 of the case whereby the edge of sheet 167 is carried directly into contact with the layers 173 on the plates 172 and properly aligned as it is simultaneously moved forward toward the production conveyor D.

Control circuit

Figure 14:
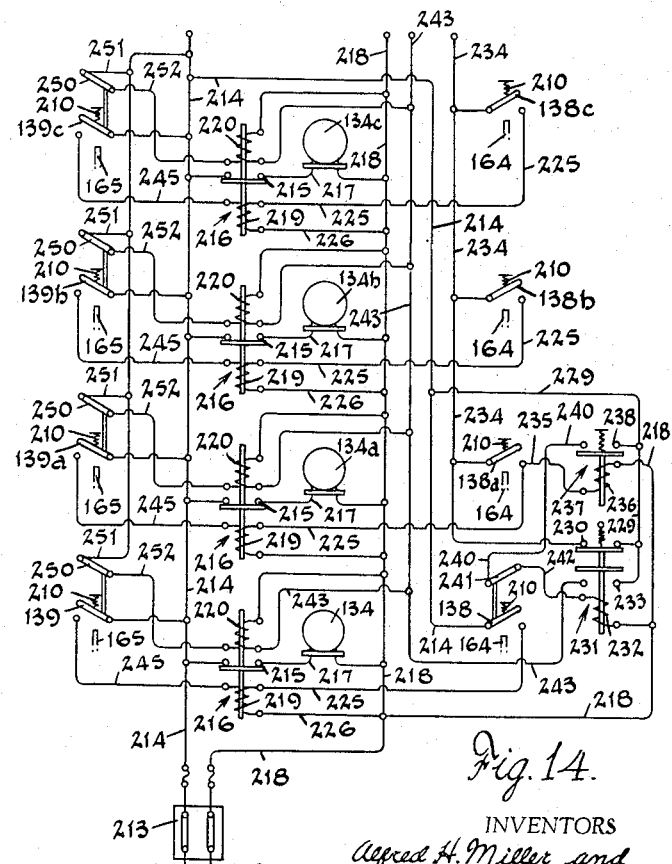
FIG. 14 is a diagrammatic view of a control system for the transfer conveying apparatus.

In FIG. 14, the electric circuits and allied controls for at least four of the pusher units U are diagrammatically illustrated with the asociated motor units being designated at 134, 134a, 134b and 134c. Likewise the aforementioned switches are indicated at 138, 138a, 138b, 138c 139, 139a, 139b and 139c; each of the switches being held in their open position by individual air jets 164 and 165 and biased to the closed position by associated springs 210. Usually the switches 138 are located, as in FIG. 4, on the "entry" side of the associated pusher units U so that the chain belts 116 will be halted before the leading end of the glass sheet is carried beneath the sheet engaging elements 115. Also, as will be noted in FIGS. 3 and 10, the oppositely disposed switches 139 will be influenced by the presence of a sheet to halt the pusher unit when the related sheet engaging elements have urged the sheet into contact with the flexible wall 170 of the aligning unit G.

Generally speaking, the circuit of each motor 134 is completed from source lines 211 and 212 through a manual switch 213. Service line 214 from source line 211 is thus connected through the normally closed contacts 215 of each relay switch 216 and line 217, through the associated motor and service line 218 to source line 212. Relay switch 216, in each instance, is equipped with opposed solenoids 219 and 220.

As hereinabove described, the electric circuits from an electric source to the several motors 134 are normally closed and the chain belts of each pusher unit are continuously operated. However, when a glass sheet passes over the air nozzles 164 and interrupts the blasts of air to the affected swtiches 138, 138a, 138b and 138c, operation of a certain number of pusher units U will be progressively halted which will, of course, depend upon the longitudinal dimension of the sheet. This will be produced by closure of switches 138, through the action of springs 210, and completion of a circuit by service line 214 and line 225 through solenoids 219 of related relay switches 216 and line 226 to service line 218 to disengage contacts 215. This operates to break the circuit of lines 214 and 217 to halt associated motors 134a, etc., respectively.

As herein provided, the circuit via line 214 to switches 138a, 138b and 138c is normally maintained by the line 229 and engaged contacts 230 of a spring-biased relay switch 231 and line 234 to the indicated switches. When switch 138a is closed, in addition to completing a circuit to the solenoid 219 of related relay switch 216, it establishes a circuit by line 235 through solenoid 236 of springbiased relay switch 237 and thence to service line 218. The switch 237 is provided with normally open contacts 238, however when solenoid 236 is energized, said contacts are engaged to complete a circuit from line 229 by line 240 to one side of a switch 241 functionally associated with switch 138.

As the trailing end of a sheet moves from beneath the first switch 138, the stream of air from nozzle 164 opens the same and simultaneously closes switch 241, thereby completing the circuit of line 240 to line 242 and through solenoid 232 of relay switch 231 to service line 218. This operates to disengage contacts 230 while engaging contacts 233. These contacts are then instrumental in establishing a circuit from line 229 to line 243 connecting through solenoids 220 of relay switches 216 to service line 218. Since the circuits through lines 229 and 234 are broken to switches 138a, 138b and 138c upon disengagement of contacts 230, the related circuits to solenoids 219 of the relay switches 216 are opened while the energization of opposed solenoids 220 will reengage the related contacts 215 of relay switches 216 thereby reestablishing the circuits of lines 214 and 217 to each of the several motors 134. Consequently, while the switches 138a, 138b and 138c, and additional switches of the same character are closed due to temporary presence of a glass sheet, the motors 134a, 134b, 134c and similar motors, will be reactivated to drive the associated chain belts 116 and cause the rollers 121 of sheet engaging elements 115 to push the sheet transversely.

In this connection, it will be appreciated that as the side of the sheet is moved from the area of the several switches 138, the same will be reopened by the air blasts from nozzles 164 to break the associated circuits of lines 225 to solenoids 219. In particular, when switch 138a again opens, the circuit of line 235 to solenoid 236 of relay switch 237 will be broken whereupon said relay will move to disengage contacts 238. This, in turn, will deenergize solenoid 232 of relay switch 231 through lines 240 and 242 despite the fact that switch 241 remains closed. Reversal of spring-biased relay switch 231 disengages contacts 233 to open the circuits of lines 229 and 243 and reengages contacts 230 to reestablish line 234 to the associated switches, such as 138a, 138b and 138c. This reconditions the control circuitry of these switches pending the entry of a subsequent sheet from the production conveyor C onto the conveyor A.

As the leading side of the sheet comes into contact with the moving surface of the aligning conveyor G, it simultaneously interrupts the streams of air from some of the nozzles 165 permitting the associated switches 139 to be closed by springs 210. The switches 139, 139a, 139b and 139c, and additional switches of the same character according to the longitudinal dimension of the sheet, will then establish circuits from service line 214 by lines 245 through solenoids 219 of related relay switches and line 226 to service line 218. This will again disengage contacts 215 to open the circuits to motors 134.

In order to restart the motors of the several pusher units, each switch 139 has a companion, simultaneously operated switch as at 250, 250a, 250b and 250c. These switches are normally closed and are moved to the open position when the switches 139 are urged by the springs 210 to the closed position. One side of each switch 250 is connected by line 251 to service line 214 with the opposite side connected to solenoids 220 of relay switches 216 through lines 252. As the trailing end of the sheet passes from between a switch combination 139 and 250 and the related air nozzle 165, the resumption of air toward switch 139 will open the same while reclosing switch 250. Consequently these switches will successively complete circuits from lines 251 by lines 252 through solenoids 220 of related relay switches 216 to service line 218. As aforementioned, energized solenoid 220 in each instance, produces a reengagement of contacts 215 to again complete the circuit of the associated motor 134.

Operation

The operation of the transfer or crossover apparatus is as follows.

A plurality of sheets S are supported on and moved in a given direction adjacent a first edge of a first conveyor C as shown in FIG. 1. As the sheets move from the conveyor C onto conveying apparatus A and under the crossover apparatus B the leading edge of the sheet will interrupt the air flow from the nozzles 164 (FIG. 3) to switch 138 allowing the switch to close which will open the circuit to the first motor 134 and temporarily halt the associated chain belt or conveyor. Continued movement of the sheet on conveyor apparatus A will close the respective switches 138a, 138b, etc. (FIG. 14), which in turn will halt the respective motors 134 associated with each switch. As the trailing edge of the sheet passes the first switch 138, the air from nozzle 164 will open the switch which will deenergize all the energized solenoids 219 of relay switches 216. The associated switch 241 will also be closed which will energize the solenoid 232 of relay switch 231 completing the circuit to solenoids 220 of relay switches 216 thereby completing the circuit to the all motors 134.

The activated motors will drive various associated chain belts or conveyors 116 which will progressively move the sheet transversely on the conveying apparatus A as the sheets continue their forward movement. As the leading side of the sheet comes into contact with the moving surface of the aligning conveyor G, it simultaneously interrupts the streams of air from the nozzles 165 to some of the switches 139 which in turn will allow the switches to close reversing the associated relay switches 216 and again temporarily halting the associated motors. As the trailing edge of the sheet passes each nozzle 165, the air stream will again open the associated switch 139 again reversing its relay switch 216 to resume operation of the associated motor. The sheet will then move to conveyor D where the second edge will be in alignment with the edge of the conveyor to be in proper position for the second processing station H.

It is to be understood that the form of the invention herewith shown and described is to be taken as a preferred embodiment of the same, and that various changes in the shape, size and arrangement of parts may be resorted to without departing from the spirit of the invention.

We claim:

1. An apparatus for conveying a plurality of sheets, including a driven member having a sheet supporting surface moving in a first direction with first and second sides disposed adjacent opposite edges of said supporting surface, a frame mounted above said driven member, a plurality of transfer units mounted on said frame; each of said units including a conveyor, a driving member for moving said conveyor in a second direction at an angle to said first direction, engaging means secured to said conveyor for engaging said sheet to move said sheet from said first side to said second side while continuing movement of said sheet in said first direction, means adjacent said first side responsive to movement of said sheet member to successively halt a plurality of said driving members and responsive to continued movement of the sheet to simultaneously reactivate said driving members, an aligning unit adjacent said second side to limit the movement of said sheet in said second direction, and means adjacent said second side responsive to movement of said sheet to temporarily halt some of said driving members and responsive to continued movement of said sheet to successively reactivate said driving members.

2. Apparatus as defined in claim 1, wherein said units are pivotally mounted on said support and including means to simultaneously raise said units above said driven member.

3. An apparatus for conveying an article comprising a conveyor for supporting and moving an article along a predetermined path, a transfer unit disposed above said path for moving said article transversely of said path from one side to the other side thereof while said conveyor continues to move said article along said path, said transfer unit including a pusher conveyor, means for driving said pusher conveyor along a second path extending transversely across said predetermined path, article engaging means carried by said pusher conveyor for movement along said second path, means adjacent said one side of said path to interrupt said drive means when said article reaches a first position along said predetermined path and to reactivate said drive means when said article reaches a second position along said path, and means adjacent said other side of said path responsive to a third position of said article along said path to again interrupt said drive means and responsive to a fourth position of said article along said path to again reactivate said drive means.

4. A conveyor system for moving an article comprising a first conveyor for supporting and moving an article along a predetermined path, a plurality of pusher units disposed above said path each having means for engaging said article, means driving said engaging means along a second path extending transversely across said predetermined path thereby to shift said article along said second path from one side of said predetermined path to the other side thereof while the article moves along said predetermined path, means activated by the movement of said article along said one side of said predetermined path to successively interrupt said drive means of certain of said pusher units, means for restarting said drive means as said article continues said movement along said one side thereby to shift said article transversely of said predetermined path to said other side, means activated by movement of said article adjacent said other side to successively interrupt the operation of said drive means for certain of said pusher units, and means for reactivating said drive means upon continued movement of said article adjacent said other side.

References Cited

UNITED STATES PATENTS

| | | | |
|---|---|---|---|
| 2,087,860 | 7/1937 | Nichols | 198—40 |
| 2,257,937 | 10/1941 | Brunnhoelzl | 193—36 |
| 2,666,535 | 1/1954 | Dooley | 198—188 |
| 2,920,737 | 1/1960 | Engelson | 198—29 |
| 3,049,218 | 8/1962 | Bishop | 198—24 |
| 3,138,238 | 6/1964 | De Good | 198—127 |
| 3,159,266 | 12/1964 | Rapparlie | 198—29 |
| 3,204,752 | 9/1965 | Conner | 198—24 |
| 3,219,167 | 11/1965 | Boinnard | 198—32 |

EVON C. BLUNK, *Primary Examiner.*

RICHARD E. AEGERTER, *Examiner.*